(12) United States Patent
Goel et al.

(10) Patent No.: US 8,884,957 B2
(45) Date of Patent: Nov. 11, 2014

(54) TESSELLATION ENGINE AND APPLICATIONS THEREOF

(75) Inventors: Vineet Goel, Winter Park, FL (US); Jason David Carroll, Oviedo, FL (US); Brian Buchner, Oviedo, FL (US); Mangesh Nijasure, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 976 days.

(21) Appl. No.: 12/708,331

(22) Filed: Feb. 18, 2010

(65) Prior Publication Data
US 2011/0057931 A1  Mar. 10, 2011

Related U.S. Application Data

(60) Provisional application No. 61/240,921, filed on Sep. 9, 2009.

(51) Int. Cl.
*G06T 15/30* (2011.01)
*G06T 17/20* (2006.01)

(52) U.S. Cl.
CPC ............. *G06T 17/20* (2013.01); *G06T 2200/28* (2013.01)
USPC ........................................................ 345/423

(58) Field of Classification Search
USPC ................................. 345/619, 423
See application file for complete search history.

(56) References Cited

U.S. PATENT DOCUMENTS

| | | | | |
|---|---|---|---|---|
| 6,115,050 A | * | 9/2000 | Landau et al. | 345/619 |
| 8,120,607 B1 | * | 2/2012 | Legakis et al. | 345/423 |
| 2002/0008698 A1 | * | 1/2002 | Pentkovski et al. | 345/419 |
| 2006/0050072 A1 | * | 3/2006 | Goel | 345/423 |
| 2007/0182762 A1 | * | 8/2007 | Wu et al. | 345/647 |
| 2009/0237401 A1 | * | 9/2009 | Wei et al. | 345/423 |
| 2010/0164955 A1 | * | 7/2010 | Sathe et al. | 345/423 |

FOREIGN PATENT DOCUMENTS

| | | |
|---|---|---|
| JP | H09198369 A | 7/1997 |
| JP | 2005-056385 A | 3/2005 |
| JP | 2005-525645 A | 8/2005 |
| WO | WO 03/096277 A2 | 11/2003 |
| WO | WO 2008/129021 A2 | 10/2008 |

OTHER PUBLICATIONS

International Search Report and Written Opinion for International Application No. PCT/US2010/048249, mailed on Nov. 19, 2010, 12 pages.
Abi-Ezza et al., "Fast Dynamic Tessellation of Trimmed NURBS Surfaced," Proc. of Eurographics '94, vol. 13, No. 3, Sep. 12, 1994 to Sep. 16, 1994, pp. C-107 thru C-126.
El-Sana et al., "Efficiently Computing and Updating Triangle Strips for Real-Time Rendering," Computer Aided Design, vol. 32, No. 13, Nov. 1, 2000, pp. 753-772.

(Continued)

*Primary Examiner* — Phi Hoang
(74) *Attorney, Agent, or Firm* — Volpe and Koenig, P.C.

(57) ABSTRACT

Disclosed herein methods, apparatuses, and systems for performing graphics processing. In this regard, a processing unit includes a tessellation module and a connectivity module. The tessellation module is configured to sequentially tessellate portions of a geometric shape to provide a series of tessellation points for the geometric shape. The connectivity module is configured to connect one or more groups of the tessellation points into one or more primitives in an order in which the series of tessellation points is provided.

20 Claims, 13 Drawing Sheets

(56) References Cited

OTHER PUBLICATIONS

Liu et al., "Developable Strip Approximation of Parametric Surfaces with Global Error Bounds," Computer Graphics and Applications, 2007, PG '07, 15$^{th}$ Pacific Conference on IEEE, Piscataway, NJ, Oct. 29, 2007, pp. 441-444.

Schwarz et al., "Fast GPU-based Adaptive Tessellation with CUDA," Proc. of Eurographics 2009, vol. 28, No. 2, Mar. 30, 2009 thru Apr. 3, 2009, pp. 365-374.

Office Action dispatched Jun. 18, 2014, in Japanese Application No. 2012-528892, Mr. Hayakawa Yuji et al., drafted Jun. 11, 2014 with English language translation.

English language abstract of Japanese Patent No. JP H09198369 A.

English language abstract of Japanese Patent No. JP 2005-056385 A.

Shigeru Kuriyama, "Smoothing and Tension Control of Polygonal Meshes by Using a Nonuniform Diffusion System", IPSJ Journal, Japan, Information Processing Society of Japan, Mar. 15, 1999, vol. 40, No. 3, pp. 1169-1176.

\* cited by examiner

| | |
|---|---|
| 0 | {1} |
| 1 | {2,1} |
| 2 | {2,1,3} |
| 3 | {4,2,1,3} |
| 4 | {4,2,5,1,3} |
| 5 | {4,2,5,1,6,3} |
| 6 | {4,2,5,1,6,3,7} |
| 7 | {8,4,2,5,1,6,3,7} |
| 8 | {8,4,9,2,5,1,6,3,7} |
| 9 | {8,4,9,2,10,5,1,6,3,7} |
| 10 | {8,4,9,2,10,5,11,1,6,3,7} |
| 11 | {8,4,9,2,10,5,11,1,12,6,3,7} |
| 12 | {8,4,9,2,10,5,11,1,12,6,13,3,7} |
| 13 | {8,4,9,2,10,5,11,1,12,6,13,3,14,7} |
| 14 | {8,4,9,2,10,5,11,1,12,6,13,3,14,7,15} |
| 15 | {16,8,4,9,2,10,5,11,1,12,6,13,3,14,7,15} |
| 16 | {16,8,17,4,9,2,10,5,11,1,12,6,13,3,14,7,15} |
| 17 | {16,8,17,4,18,9,2,10,5,11,1,12,6,13,3,14,7,15} |
| 18 | {16,8,17,4,18,9,19,2,10,5,11,1,12,6,13,3,14,7,15} |
| 19 | {16,8,17,4,18,9,19,2,20,10,5,11,1,12,6,13,3,14,7,15} |
| 20 | {16,8,17,4,18,9,19,2,20,10,21,5,11,1,12,6,13,3,14,7,15} |
| 21 | {16,8,17,4,18,9,19,2,20,10,21,5,22,11,1,12,6,13,3,14,7,15} |
| 22 | {16,8,17,4,18,9,19,2,20,10,21,5,22,11,23,1,12,6,13,3,14,7,15} |
| 23 | {16,8,17,4,18,9,19,2,20,10,21,5,22,11,23,1,24,12,6,13,3,14,7,15} |
| 24 | {16,8,17,4,18,9,19,2,20,10,21,5,22,11,23,1,24,12,25,6,13,3,14,7,15} |
| 25 | {16,8,17,4,18,9,19,2,20,10,21,5,22,11,23,1,24,12,25,6,26,13,3,14,7,15} |
| 26 | {16,8,17,4,18,9,19,2,20,10,21,5,22,11,23,1,24,12,25,6,26,13,27,3,14,7,15} |
| 27 | {16,8,17,4,18,9,19,2,20,10,21,5,22,11,23,1,24,12,25,6,26,13,27,3,28,14,7,15} |
| 28 | {16,8,17,4,18,9,19,2,20,10,21,5,22,11,23,1,24,12,25,6,26,13,27,3,28,14,29,7,15} |
| 29 | {16,8,17,4,18,9,19,2,20,10,21,5,22,11,23,1,24,12,25,6,26,13,27,3,28,14,29,7,30,15} |
| 30 | {16,8,17,4,18,9,19,2,20,10,21,5,22,11,23,1,24,12,25,6,26,13,27,3,28,14,29,7,30,15,31} |
| 31 | {32,16,8,17,4,18,9,19,2,20,10,21,5,22,11,23,1,24,12,25,6,26,13,27,3,28,14,29,7,30,15,31} |

FIG. 11

TESSELLATION ENGINE AND APPLICATIONS THEREOF

CROSS REFERENCE TO RELATED APPLICATIONS

This application claims benefit under 35 U.S.C. §119(e) to U.S. Provisional Patent Application No. 61/240,921, entitled "Tessellation Engine and Applications Thereof," to Goel et al., filed Sep. 9, 2009, the entirety of which is hereby incorporated by reference as if fully set forth herein.

BACKGROUND

1. Field of the Invention

The present invention is generally directed to computing operations performed in computing systems. More particularly, the present invention is directed to a processing unit (such as, for example, a graphics processing unit (GPU)) that performs computing operations and applications thereof.

2. Background Art

A GPU is a complex integrated circuit that is specially designed to perform data-parallel computing tasks, such as graphics-processing tasks. A GPU may, for example, execute graphics-processing tasks required by an end-user application, such as a video-game application.

FIG. 1 illustrates that several layers of software may exist between an end-user application 102 and a GPU 108. End-user application 102 communicates with an application-programming interface (API) 104. API 104 allows end-user application 102 to output graphics data and commands in a standardized format, rather than in a format that is dependent on GPU 108. API 104 communicates with a driver 106. Driver 106 translates standard code received from API 104 into a native format of instructions understood by GPU 108. Driver 106 is typically written by the manufacturer of GPU 108. GPU 108 then executes the instructions received from the driver.

Several APIs are commercially available. A relatively large segment of end-user applications are compatible with DirectX® developed by Microsoft Corporation of Redmond, Wash. To reach this relatively large segment of end-user applications, a GPU should be compatible with DirectX®.

A recent version of DirectX is known as DirectX 11 ("DX11"). DX11 uses a unified shader model in which a GPU implements a sequence of shaders. For example, FIG. 2 illustrates an example sequence of shaders 200 specified by DX11. As illustrated in FIG. 2, the GPU executes a vertex shader 202, then a hull shader 204, then a tessellation shader 206, and then one or more additional shaders 208 to provide results data. In the unified shader model, intermediate results provided by previously executed shaders (such as, hull shader 204) may be used by the GPU to execute subsequent shaders (such as, tessellation shader 206). Unfortunately, DX11 includes schemes that are not optimal from a GPU hardware perspective.

What is needed, therefore, are systems, apparatuses, and methods that are not only compatible with DX11, but also operate efficiently from a GPU hardware perspective.

SUMMARY OF EMBODIMENTS OF THE INVENTION

Embodiments of the present invention meet the above-described needs. For example, an embodiment of the present invention provides a graphics-processing method implemented in a processing unit. This graphics-processing method includes sequentially tessellating portions of a geometric shape to provide a series of tessellation points for the geometric shape. This graphics-processing method further includes connecting one or more groups of the tessellation points into one or more primitives in an order in which the series of tessellation points is provided.

Another embodiment of the present invention provides a processing unit that includes a tessellation module and a connectivity module. The tessellation module is configured to sequentially tessellate portions of a geometric shape to provide a series of tessellation points for the geometric shape. The connectivity module is configured to connect one or more groups of the tessellation points into one or more primitives in an order in which the series of tessellation points is provided.

A further embodiment of the present invention provides a computing system that includes a system memory, a processing unit, and a bus coupled to the system memory and the processing unit. The processing unit includes a tessellation module and a connectivity module. The tessellation module is configured to sequentially tessellate portions of a geometric shape to provide a series of tessellation points for the geometric shape. The connectivity module is configured to connect one or more groups of the tessellation points into one or more primitives in an order in which the series of tessellation points is provided.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 9A:
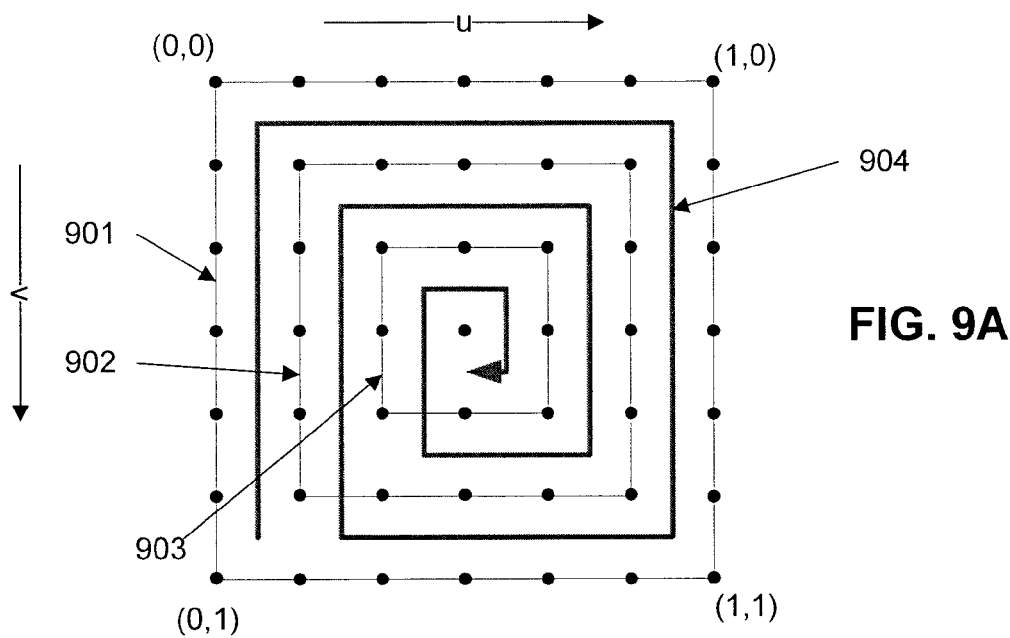
Figure 9B:
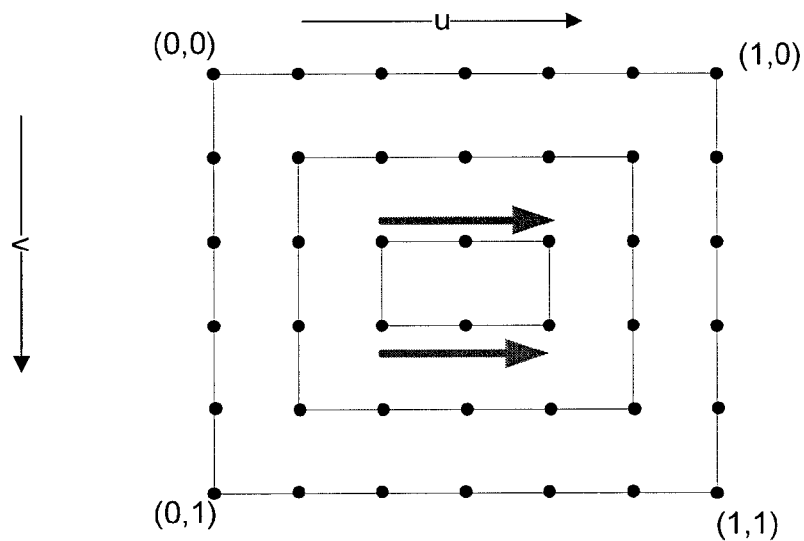
Figure 9C:
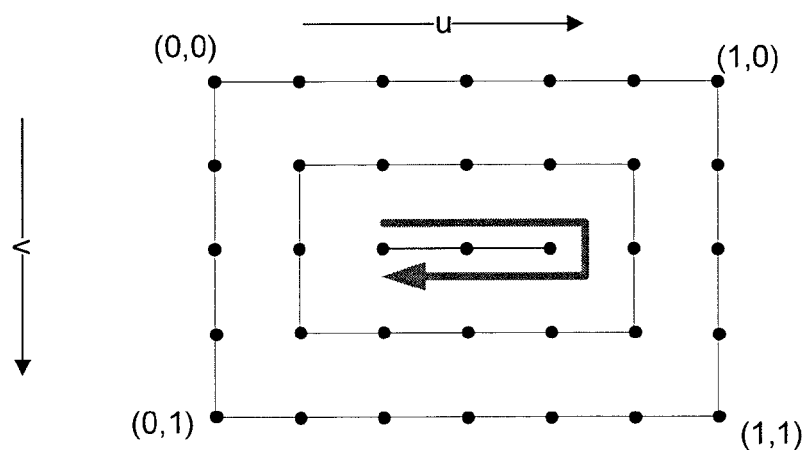

FIGS. 9A-C illustrates example sequences for generating tessellation points of a patch in accordance with embodiments of the present invention.

Figure 7:
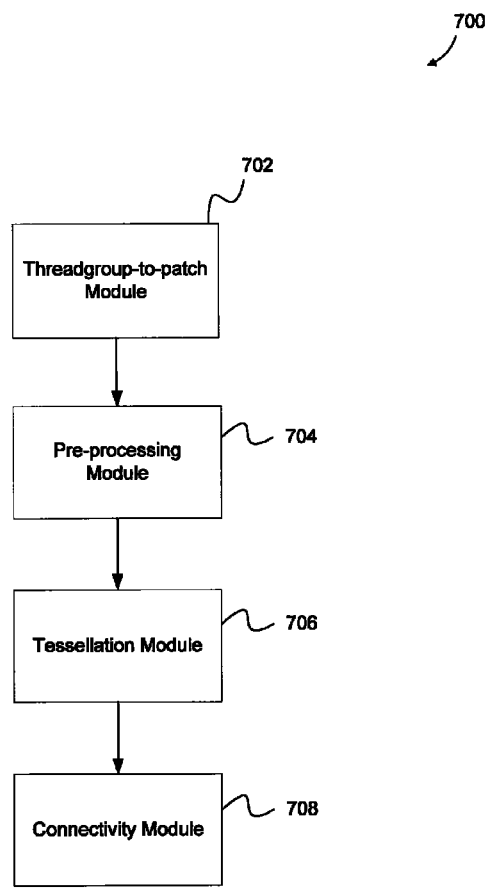
FIG. 7 illustrates example functional blocks of a processing unit for executing a tessellation shader in accordance with an embodiment of the present invention.
Figure 10:
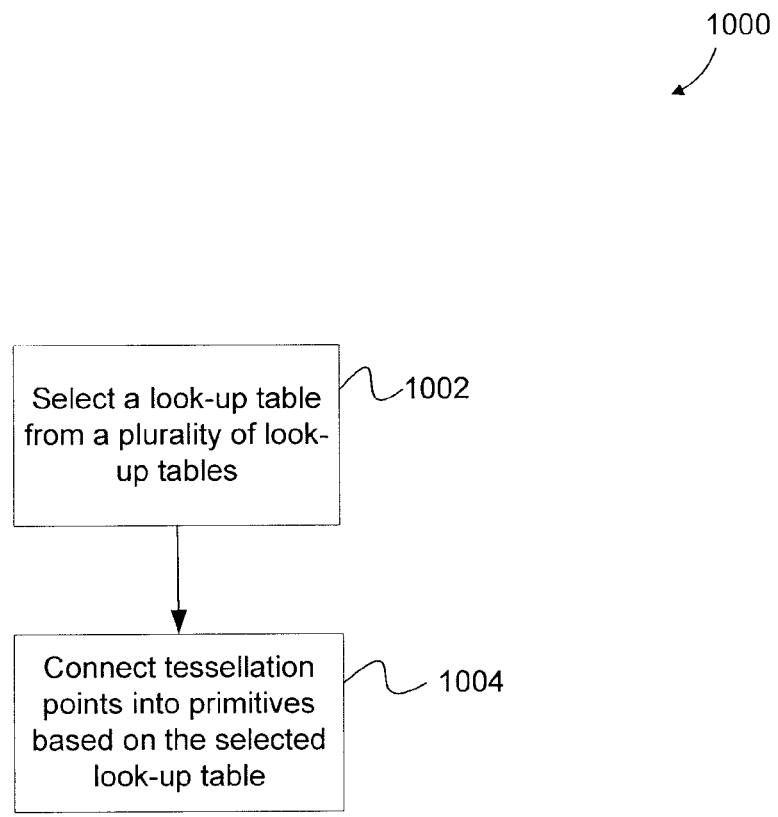

FIG. 10 illustrates an example method for connecting tessellation points into primitives, implemented by a connectivity module of FIG. 7, in accordance with an embodiment of the present invention.

FIG. 11 illustrates example lookup tables (LUTs) used for determining connectivity in accordance with an embodiment of the present invention.

Figure 12:
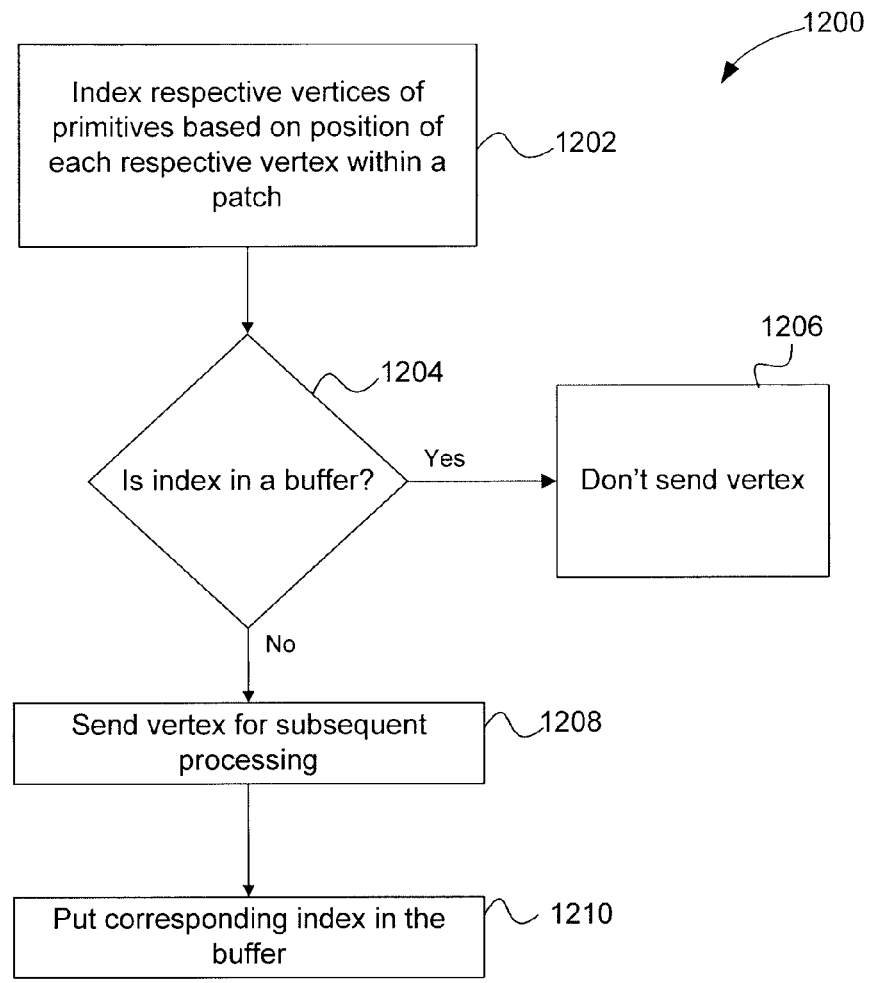

FIG. 12 illustrates an example method for re-using vertices of primitives, implemented by a connectivity module of FIG. 7, in accordance with an embodiment of the present invention.

Figure 13:
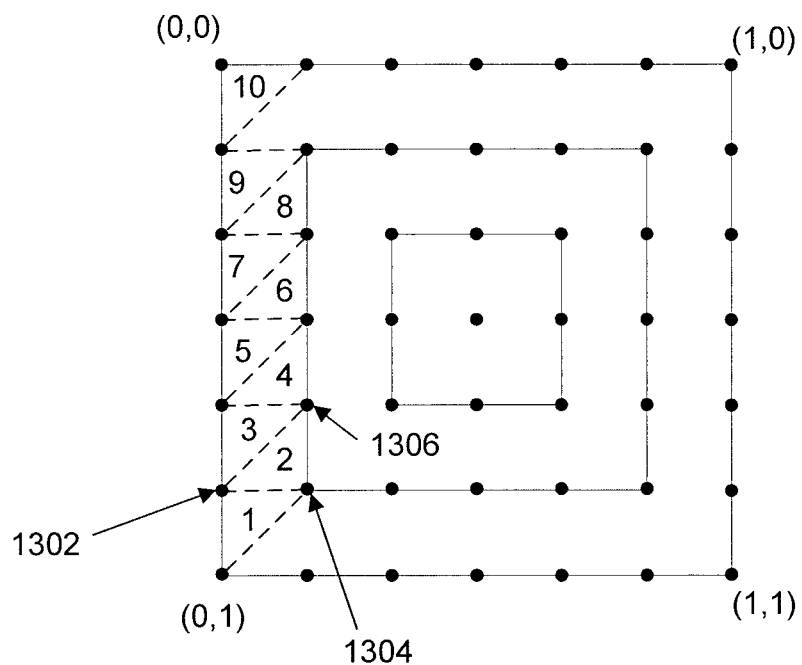

FIG. 13 illustrates how tessellation points of FIG. 9A may be connected into primitives in accordance with an embodiment of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview

An embodiment of the present invention provides a processing unit with a tessellation engine, and applications thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
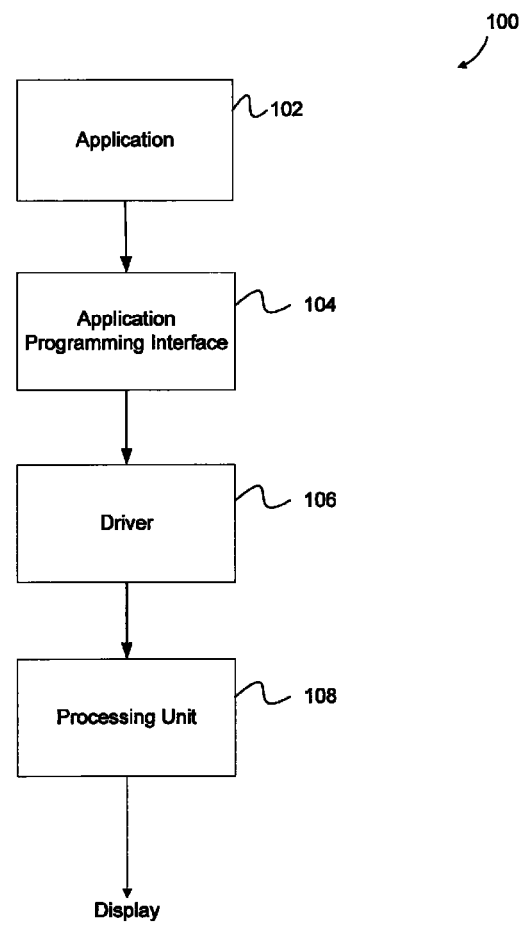
FIG. 1 is a block diagram illustrating an example work flow for processing graphics.
Figure 2:
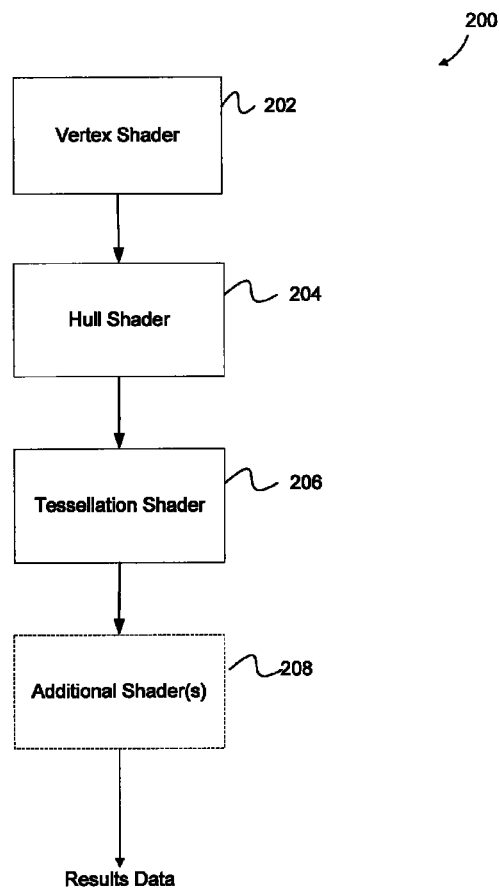
FIG. 2 illustrates example shaders included in a graphics pipeline of an example three-dimensional graphics API.

As mentioned above with respect to FIG. 2, a typical graphics pipeline includes a plurality of shaders, including a tessellation shader 206. The input to the tessellation shader 206 includes a patch—i.e., a geometric shape (such as, a rectangle, a triangle, or a line). One purpose of the tessellation shader 206 is to tessellate the patch into a plurality of points. During subsequent stages of the graphics pipeline, the points may be subjected to further processing. For example, the points may be connected into primitives (e.g., triangles). A processing unit according to an embodiment of the present invention includes a tessellation engine configured to efficiently execute tessellation shader 206 from a hardware perspective, thereby providing better performance (e.g., faster processing) with a reduced area footprint compared to conventional processing units.

For illustrative purposes only, and not limitation, embodiments of the present invention will be described herein in terms of a GPU. A person skill in the relevant art(s) will appreciate, however, that the present invention may be applied to other types of processing units—such as central processing units and coprocessors—that execute a tessellation shader. These other types of processors are contemplated within the spirit and scope of the present invention.

According to an embodiment of the present invention, a GPU dynamically uses an off-chip memory and an on-chip memory for execution of the tessellation shader, and applications thereof. The off-chip memory is referred to as an off-chip local data share (LDS), and the on-chip memory is referred to as an on-chip LDS. If tessellation is low (e.g., fewer than 100 vertices are involved), then the on-chip LDS is used. If tessellation is high (e.g., greater than 100 vertices are involved), then the off-chip LDS is used. The GPU driver indicates through a register write (e.g., one bit) whether the on-chip or off-chip LDS is used. The decision whether to use the on-chip or off-chip LDS for tessellation output is made dynamically.

Another embodiment of the present invention is directed to a tessellation engine that enables a GPU to generate points for tessellation in a manner that is compatible with a scheme specified by DX11, but that is more efficient from a hardware perspective than the scheme specified by DX11. As mentioned above, tessellation is performed on a patch, i.e., a geometric shape (such as, a rectangle, a triangle, or a line). The tessellation engine of the GPU is configured to tessellate the patch to provide tessellation points in an order in which a connectivity engine is configured to connect the tessellation points. In contrast, the DX11 algorithm generates all the tessellation points and stores the tessellation points in memory, and then retrieves these tessellation points from memory during connectivity processing. Unlike the DX11 algorithm, the tessellation engine of an embodiment of the present invention does not need to store the tessellation points in memory, because the tessellation engine are generated in the order in which they are processed in the connectivity engine.

In an embodiment, the tessellation engine includes two math units to generate the tessellation points. A first math unit is configured to generate points for an outside edge of a patch, and a second math unit is configured to generate points for an inside edge of the patch. Each math unit includes an output FIFO and an input FIFO. The output FIFOs have two read ports, enabling two points to be read per clock cycle. As a result, the two math units of the tessellation engine can generate points of a primitive (e.g., a triangle) in a single clock cycle. After several clock cycles, the tessellation engine generates all the points of the patch by following a serpentine path. In this way, the points of the patch are generated on the fly in a manner that is appropriate for subsequent connectivity processing, but that does not require a memory to store all points of the patch as specified by DX11.

A further embodiment of the invention is directed to a GPU, and applications thereof, that provides only unique tessellated-point data, thereby saving processing resources. In an embodiment, the GPU includes a tessellation module and a connectivity module. The tessellation module provides tessellated-point data to the connectivity module. The connectivity module creates primitives based on the topology (e.g., point, line, or triangle) of the tessellated-point data. The connectivity module sends out the data in strip form and sends relative indices for the primitives.

A still further embodiment of the present invention is directed to a tessellation engine, and applications thereof, that selects a lookup table (LUT) from a plurality of LUTs to determine whether tessellation points of a patch are connected. By selecting the one LUT from the plurality of LUTs, the tessellation engine of an embodiment of the present invention can provide one primitive per clock cycle. In contrast, using a single LUT as specified by DX11 may require up to 32 clock cycles to provide a primitive.

Further details of an example tessellation engine in accordance with an embodiment of the present invention are described below. Before providing these details, however, it is helpful to describe an example system in which such a tessellation engine may be implemented.

II. An Example System

Figure 3:
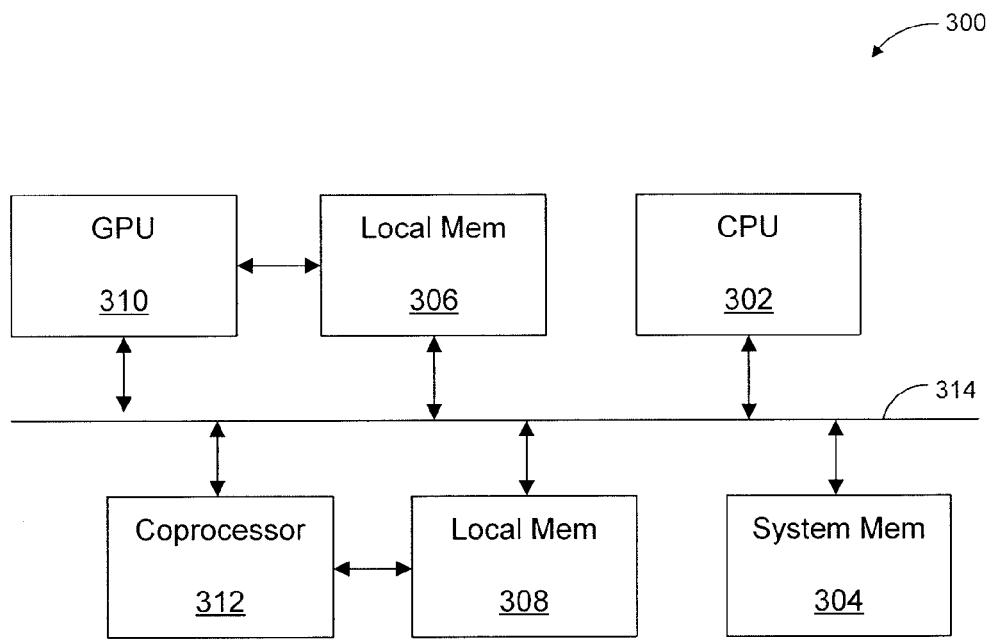
FIG. 3 is a block diagram of an example computing system in accordance with an embodiment of the present invention.

FIG. 3 is a block diagram of a computing system 300 according to an embodiment. Computing system 300 includes a CPU 302, a GPU 310, and may optionally include a coprocessor 312. In the embodiment illustrated in FIG. 3, CPU 302 and GPU 310 are included on separate integrated circuits (ICs) or packages. In other embodiments, however, CPU 302 and GPU 310, or the collective functionality thereof, may be included in a single IC or package.

In addition, computing system 300 also includes a system memory 304 that may be accessed by CPU 302, GPU 310, and coprocessor 312. In embodiments, computing system 300 may comprise a supercomputer, a desktop computer, a laptop computer, a video-game console, an embedded device, a handheld device (e.g., a mobile telephone, smart phone, MP3 player, a camera, a GPS device, or the like), or some other device that includes or is configured to include a GPU. Although not specifically illustrated in FIG. 3, computing system 300 may also include a display device (e.g., cathode-ray tube, liquid crystal display, plasma display, etc.) for displaying content (e.g., graphics, video, etc.) of computing system 300. The display device is used to display content to a user (such as, when computing system 300 comprises a computer, video-game console, or handheld device).

GPU 310 assists CPU 302 by performing certain special functions (such as, graphics-processing tasks and data-parallel, general-compute tasks), usually faster than CPU 302 could perform them in software. In embodiments, GPU 310 may be integrated into a chipset and/or CPU or other processors. Additional details of GPU 310 are provided below.

Coprocessor 312 also assists CPU 302. Coprocessor 312 may comprise, but is not limited to, a floating point coprocessor, a GPU, a video processing unit (VPU), a networking coprocessor, and other types of coprocessors and processors as would be apparent to a person skilled in the relevant art(s).

GPU 310 and coprocessor 312 communicate with CPU 302 and the system memory over a bus 314. Bus 314 may be any type of bus used in computer systems, including a peripheral component interface (PCI) bus, an accelerated graphics port (AGP) bus, a PCI Express (PCIE) bus, or another type of bus whether presently available or developed in the future.

In addition to system memory 304, computing system 300 further includes local memory 306 and local memory 308. Local memory 306 is coupled to GPU 310 and may also be coupled to bus 314. Local memory 308 is coupled to coprocessor 312 and may also be coupled to bus 314. Local memories 306 and 308 are available to GPU 310 and coprocessor 312 respectively in order to provide faster access to certain data (such as data that is frequently used) than would be possible if the data were stored in system memory 304.

In an embodiment, GPU 310 and coprocessor 312 decode instructions in parallel with CPU 302 and execute only those instructions intended for them. In another embodiment, CPU 302 sends instructions intended for GPU 310 and coprocessor 312 to respective command buffers.

Although not specifically illustrated in FIG. 3, computing system 300 may also include or be coupled to a display device (e.g., cathode-ray tube, liquid crystal display, plasma display, or the like). The display device is used to display content to a user (such as, when computing system 300 comprises a computer, video-game console, or handheld device).

III. Additional Details of an Example Computing System

Figure 4:
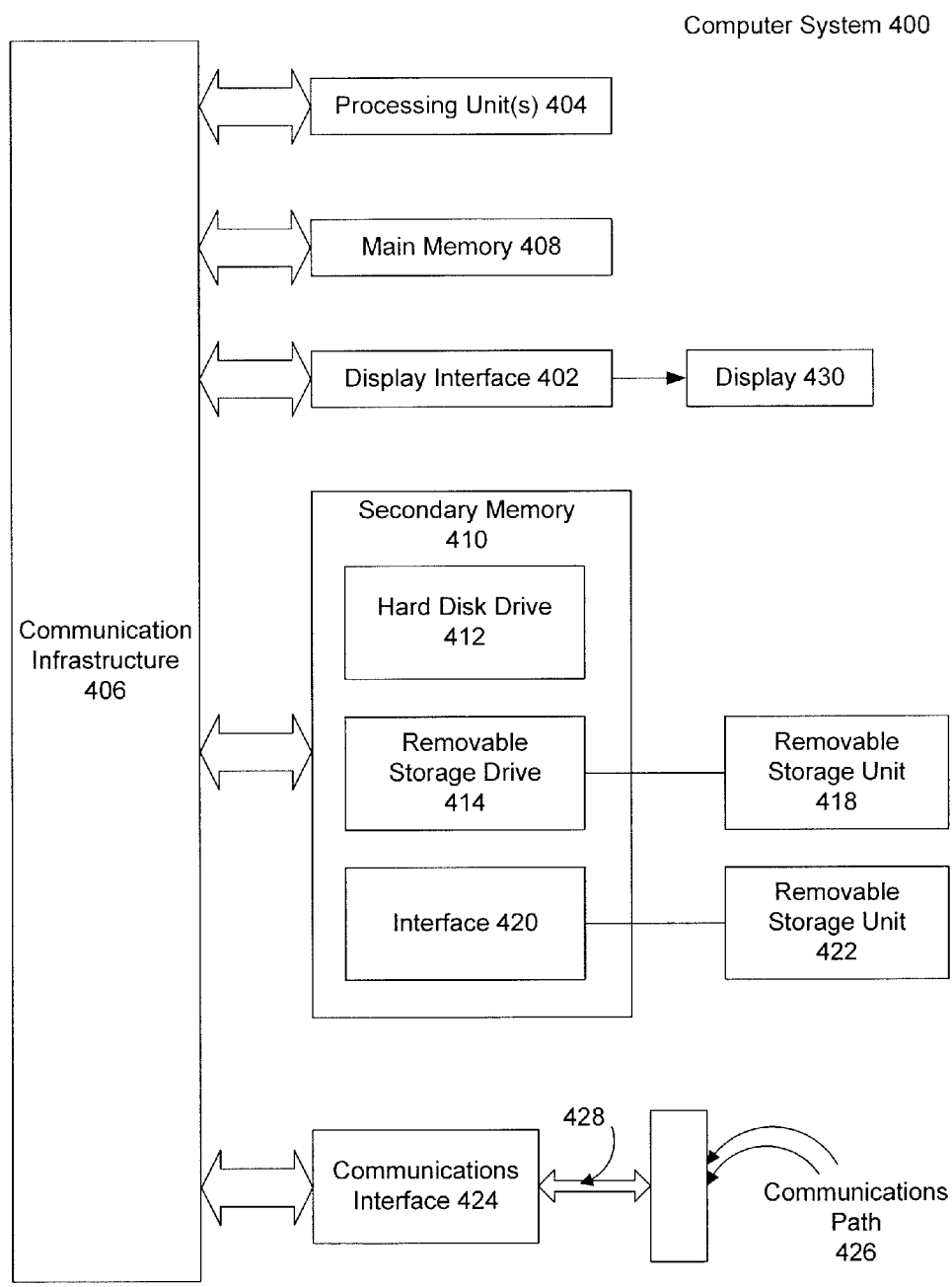
FIG. 4 illustrates additional components included in an example computing system according to an embodiment of the present invention.

As set forth above, FIG. 3 illustrates an example computing system 300 of an embodiment of the present invention. FIG. 4 illustrates additional components that may be included in an example computing system 400 in accordance with an embodiment of the present invention.

Computing system 400 includes one or more processing units 404. Processing unit(s) 404 may be a general-purpose processing unit (such as, CPU 302 of FIG. 3) or a special-purpose processing unit (such as, GPU 310 of FIG. 3). Processing unit(s) 404 is (are) connected to a communication infrastructure 406 (e.g., a communications bus (such as bus 314 of FIG. 3), a cross-over bar, or a network).

Computing system 400 also includes a display interface 402 that forwards graphics, text, and other data from communication infrastructure 406 (or from a frame buffer not shown) for display on display unit 430 (such as, a liquid crystal display).

Computing system 400 also includes a main memory 408, preferably random access memory (RAM), such as system memory 304 of FIG. 3. In addition, computing system 400 may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418 represents a floppy disk, magnetic tape, optical disk, etc. which is read by and written to by removable storage drive 414. As will be appreciated, the removable storage unit 418 includes a computer-readable storage medium having stored therein computer software and/or data.

In alternative embodiments, secondary memory 410 may include other similar devices for allowing computer programs or other instructions to be loaded into computing system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computing system 400.

Computing system 400 may also include a communications interface 424. Communications interface 424 allows software and data to be transferred between computing system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 are in the form of signals 428 which may be electronic, electromagnetic, optical or other signals capable of being received by communications interface 424. These signals 428 are provided to communications interface 424 via a communications path (e.g., channel) 426. This channel 426 carries signals 428 and may be implemented using wire or cable, fiber optics, a telephone line, a cellular link, an radio frequency (RF) link and other communications channels.

In this document, the term "computer-readable storage medium" is used to generally refer to media such as removable storage drive 414 and a hard disk installed in hard disk drive 412. These computer program products provide software to computing system 400.

Computer programs (also referred to as computer control logic or instructions) are stored in main memory 408 and/or secondary memory 410. Computer programs may be loaded into computing system 400 using removable storage drive 414, hard drive 412, or communications interface 424. Such computer programs, when executed, enable the computing system 400 to perform features of embodiments of the present invention, as discussed herein. For example, the computer programs, when executed, enable at least one of processing unit 404 to execute a tessellation shader in accordance with an embodiment of the present invention. An example of the execution of such a tessellation shader is described below.

IV. An Example GPU

Figure 5:
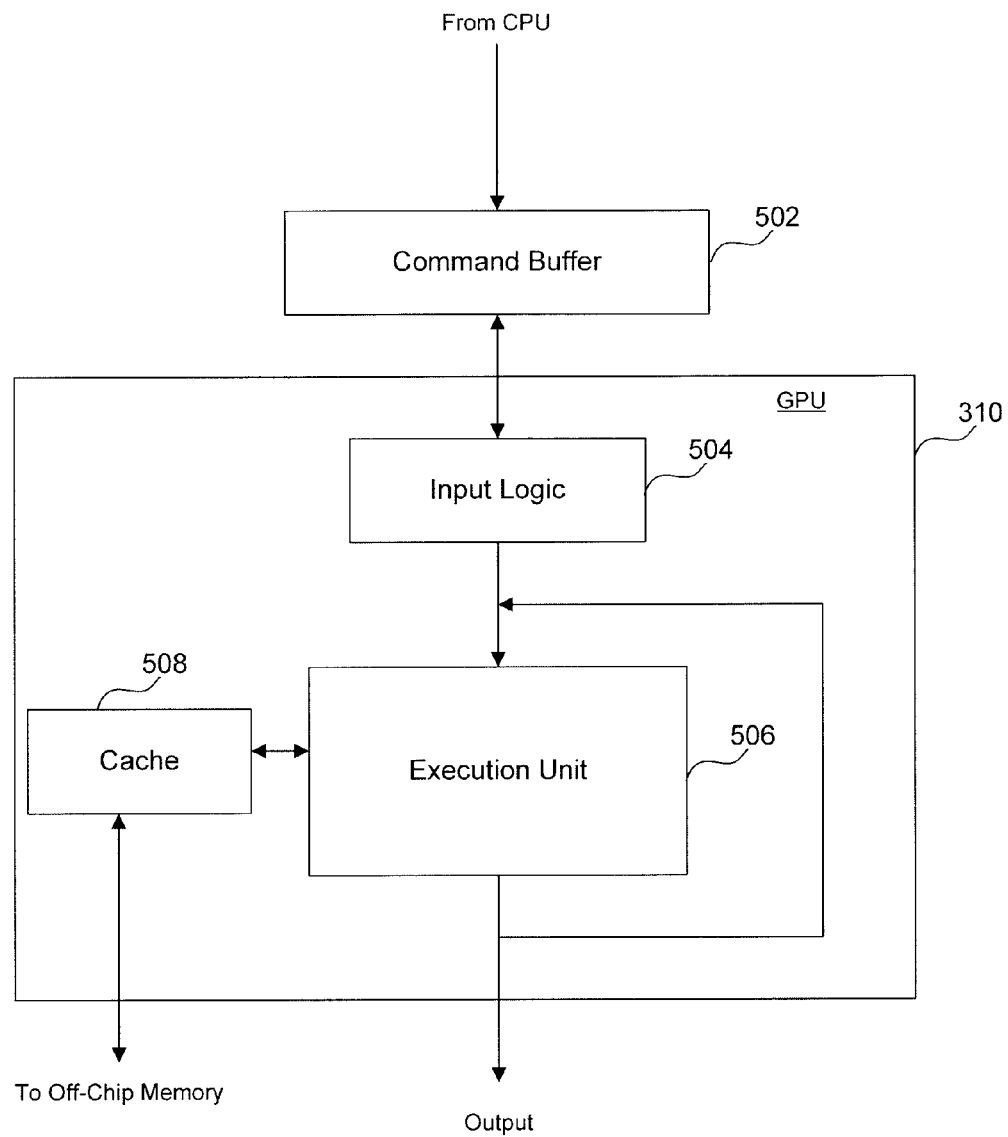
FIG. 5 is a block diagram of an example GPU in accordance with an embodiment of the present invention.

FIG. 5 is a block diagram of an example GPU 310 that executes a tessellation shader in accordance with an embodiment of the present invention. As shown in the embodiment of FIG. 5, GPU 310 is coupled to a command buffer 502 and includes input logic 504, a execution unit 506, and a cache 508.

Input logic 504 performs pre-processing on the graphics-processing tasks and general-compute tasks. Input logic 504 identifies all the shader programs associated with a graphics-processing and/or general-compute task, and schedules when each shader program can be launched in execution unit 506 based on input and output data that will be available. For example, a particular graphics-processing task may require the execution of a first shader program and a second shader program, wherein the second shader program is dependent on data generated by the first shader program. In accordance with this example, input logic 504 identifies the first and second shader programs and schedules the first shader program to be executed before the second shader program, so that the data for the second shader program will be available when the second shader program is launched. After pre-processing the graphics-processing and general-compute tasks, input logic 504 issues these tasks to execution unit 506.

Execution unit 506 includes a plurality of compute resources (e.g., single-instruction, multiple-data (SIMD) devices). The tasks to be executed by execution unit 506 may be broke up into a plurality of work loads, wherein work loads may be issued to different compute resources (e.g., SIMDs) in parallel. Input logic 504 keeps track of which workloads are processed by the different compute resources (e.g., SIMDs) within execution unit 506, enabling a plurality of threads to execute in parallel. In an embodiment, for example, more than 30,000 threads may execute in execution unit 506 at any one time. The results of the operations of execution unit 506 are sent to an output buffer (such as, for example, a frame buffer). The output buffer may be included on the same chip as GPU 310 or may be included in an off-chip memory.

Cache 508 stores data that is frequently used by execution unit 506. When data is needed by execution unit 506 to execute a shader program, first a request is made to cache 508. If there is a cache hit in cache 508 (i.e., the requested data is in cache 508), the data is forwarded to execution unit 506. If there is a cache miss in cache 508 (i.e., the requested data is not in cache 508), the request data is retrieved from off-chip memory. In an embodiment, cache 508 comprises one or more level 1 (L1) caches and one or more level 2 (L2) caches, wherein the L1 caches have less storage capacity but provide faster data access than the L2 caches.

In a unified shader model, a GPU executes a sequence of shaders. To execute the shaders, the GPU includes a plurality of SIMDs. Each SIMD is associated with its own local data store (LDS). Each LDS has limited memory (e.g., 32 kilobytes). The specific sequence of shaders that the GPU executes is dictated by an API to which the GPU is coupled. In a typical sequence, the GPU executes a vertex shader, a hull shader, and then a tessellation shader. During execution of the vertex shader and the hull shader, a SIMD may receive a plurality of vertices to process and will write its results into its associated LDS.

One problem is that, for a given set of vertices, the tessellation shader should be implemented by the same SIMD that performs the vertex shader and the hull shader because the data used to execute the tessellation shader is in the LDS of the SIMD that performed the vertex shader and the hull shader. Even though the GPU may have other available compute resources (e.g., other SIMDs) that could enable the GPU to more-quickly execute the tessellation shader, the other available compute resources cannot be used because they do not have access to the necessary data.

Figure 6:
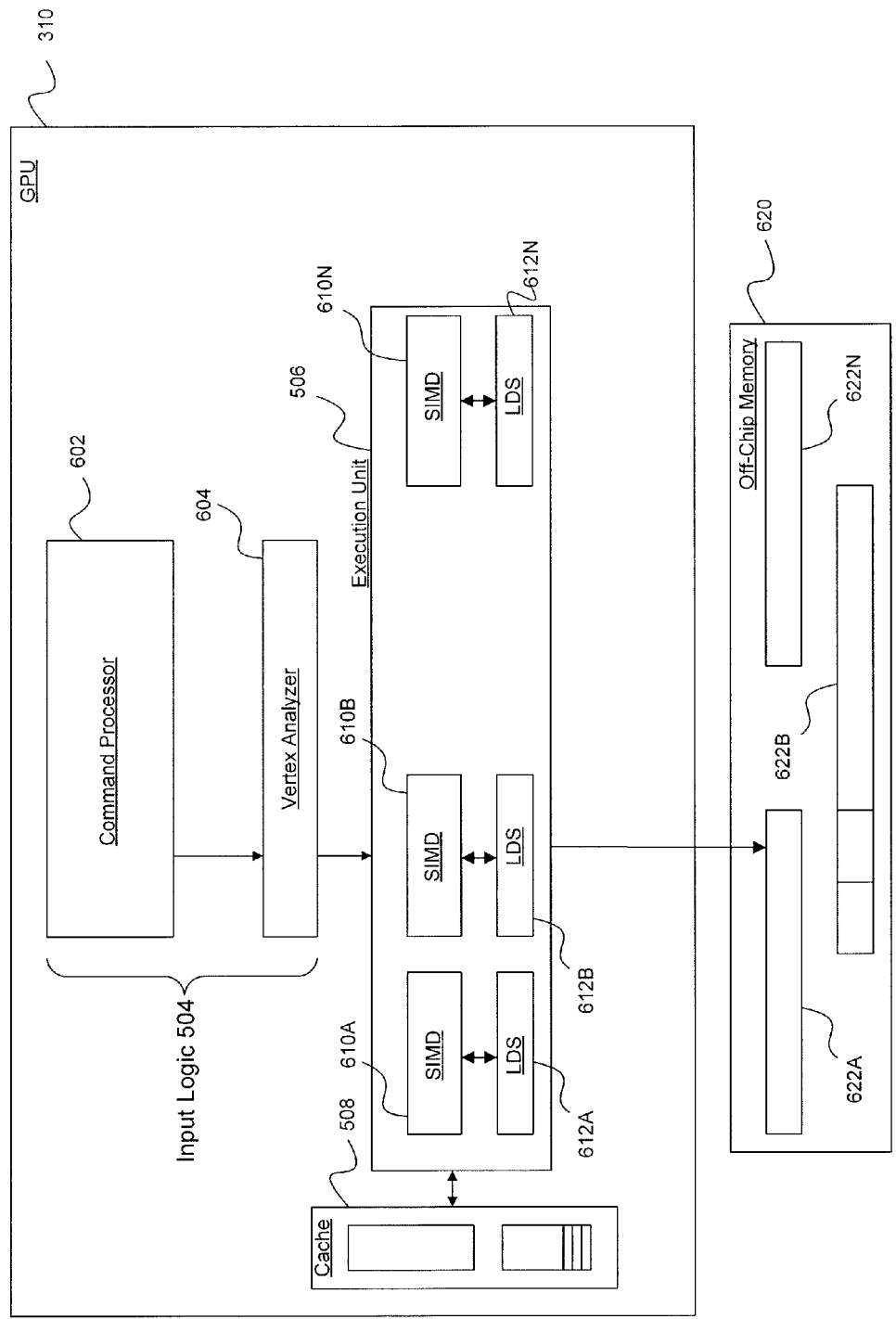
FIG. 6 is a block diagram of additional details of the GPU of FIG. 5.

To address this problem, a GPU 310 in accordance with an embodiment of the present invention dynamically uses an off-chip LDS 622 (of an off-chip memory 620) or an on-chip LDS (of GPU 310) for the tessellation shader, as illustrated in FIG. 6. Referring to FIG. 6, there is a mirrored off-chip LDS 622 for each SIMD 610 of GPU 310. Input logic 504 includes a command processor 602 (which receives graphics-processing and general-compute tasks to be executed by GPU 310) and a vertex analyzer 604 (which schedules when each shader program can be launched in execution unit 506). Execution unit 506 of GPU 310 includes a plurality of SIMDs 610A-610N. Each SIMD is associated with one of the plurality of on-chip LDSs 612A-612N. For patches in the hull shader (HS) threadgroup, the HS data can be written to either an on-chip LDS 612 associated with a SIMD 610 (if the tessellation level is low, e.g., involves fewer than 100 vertices) or an off-chip LDS 622 (if the tessellation level is high, e.g., involved greater than 100 vertices). A code at the end of HS decides whether HS data is written to an on-chip LDS 612 or an off-chip LDS 622. In an embodiment, each off-chip LDS 622 is quad-buffered, thereby allowing the same SIMD to operate on four times as many threadgroups.

V. Tessellation Engine

In an embodiment, GPU 310 includes a tessellation engine. The tessellation engine tessellates patches based on a tessellation factor for each edge of the patch. There can be two, four, or six tessellation factors per patch. Based on these factors, the tessellation engine breaks up the patch into numerous points, lines, or triangles based on the tessellation topology.

For example, FIGS. 9A-C illustrate example patches. In the example of FIGS. 9A-C, the patches are illustrated as rectangles, but they could also be triangles, lines or another geometric shape. For the patch of FIG. 9A, the tessellation factor along the v direction is 6, resulting in 6 line segments between point (0,0) and point (0,1). For the patch of FIG. 9B, the tessellation factor along the v direction is 5, resulting in 5 line segments between point (0,0) and point (0,1). For the patch of FIG. 9C, the tessellation factor along the v direction is 4, resulting in 4 line segments between point (0,0) and point (0,1). In a similar manner, for the patches in each of FIGS. 9A-C, the tessellation factor along the u direction is 6, resulting in 6 line segments between point (0,0) and point (1,0).

The tessellation engine receives work in the form of threadgroups. Each threadgroup defines a number of patches, a starting address into the tessellation factor memories used to fetch tessellation factors, and other state information. The tessellation engine processes each patch from an input threadgroup, requests the number of tessellation factors it needs for each patch, and tessellates the patch based on various state data (partition, topology, axis, etc.). The tessellation engine outputs vertex data and primitive data. The vertex data out of the tessellation engine comprises u,v values.

FIG. 7 illustrates functional blocks of a tessellation engine in accordance with an embodiment of the present invention. Referring to FIG. 7, the tessellation engine includes a thread-to-patch module 702, a pre-processing module 704, a tessellation module 706, and a connectivity module 708. Each of these functional blocks is described in more detail below.

A. Thread-to-Patch Module 702

Thread-to-patch module 702 converts a threadgroup to a patch. Each threadgroup is received as input from the hull shader (such as, hull shader 204 of FIG. 2). This conversion includes a determination of (i) how many tessellation factors each patch needs, (ii) the address into the tessellation factor memory for each factor for the patch, and (ii) requests tessellation factors from a vertex cache (VC). The requested tessellation factors are buffered together per patch. All of the tessellation factors for the patch and state information are sent to pre-processing module 704 for each patch in the threadgroup. Thread-to-patch module 702 also sends a flag to mark the end of a threadgroup and the end of a packet.

The tessellation factors are received by the tessellation engine in IEEE floating point format. However, the math operations used to tessellate are processed in fixed point. So, to make the hardware efficient, there is only one float-to-fixed converter and the values are converted as they arrive one at a time from the VC. The unit also performs clamping of the tessellation factors to a value between 0.0 and 64.0.

B. Pre-Processing Module 704

Pre-processing module 704 receives one patch at a time and pre-calculates values used to tessellate that patch. That is, in an embodiment, for a given patch, tessellation module 706 repeatedly uses several numbers to compute the parametric positions of tessellation points for that patch. These numbers are based on the tessellation factor for a given edge of the patch. Since the set of tessellation factors will be the same per patch, pre-processing module can compute the numbers that are repeatedly used and provide them to tessellation module 706.

Included below is pseudo-code that may be implemented by pre-processing module 704. It is to be appreciated, however, that this pseudo-code is included for illustrative purposes only, and not limitation. In the pseudo-code that follows, factors that are bolded are those that are pre-calculated by pre-processing module 704 and then provided to tessellation module 706.

```
half_tess_factor = (tess_factor+1)/2
if(partition_type = odd || half_tess_factor = 0.5){
    half_tess_factor = half_tess_factor + 0.5
}
floor_half_tess_factor = floor(half_tess_factor)
ceil_half_tess_factor = ceil(half_tess_factor)
half_tess_factor_fraction = half_tess_factor - floor_half_tess_factor
num_half_tess_factor_points = ceil_half_tess_factor >> 16
if(floor_half_tess_factor = ceil_half_tess_factor){
    split_point = num_half_tess_factor_points + 1
}
else if(partition_type = odd){
```

-continued

```
    if(floor_half_tess_factor = 1.0){
        split_point = 0
    }
    else{
        split_point = (RemoveMSB((fxpFloorHalfTessFactor>>16)-
1)<<1) + 1
    }
}
else{
    split_point = (RemoveMSB(fxpFloorHalfTessFactor>>16)<<1) + 1
}
num_floor_segments = (floor_half_tess_factor * 2) >> 16
num_ceil_segments = (ceil_half_tess_factor * 2) >> 16
inv_num_floor_segments = fixed_reciprocal (num_floor_segments )
inv_num_ceil_segments = fixed_reciprocal (num_ceil_segments )
```

C. Tessellation Module 706

Tessellation module 706 receives patch information from pre-processing module 704 and creates all of the tessellated points of the patch. Unlike tessellation module 706, the DX11 algorithm calculates every point in the patch and stores it in memory to be used during the connectivity pass. However, a single patch can have up to 4,225 points so this is not efficient for the hardware. To address this problem, tessellation module 706 sequentially tessellates portions of the patch to generate a series of tessellation points that are provided to connectivity module 708 in the order in which it is determined whether the tessellation points are connected into primitives. In this way, unlike the DX11 algorithm, the tessellation points from tessellation module 706 do not need to be stored in memory prior to being provided to connectivity module 708.

Figure 8:
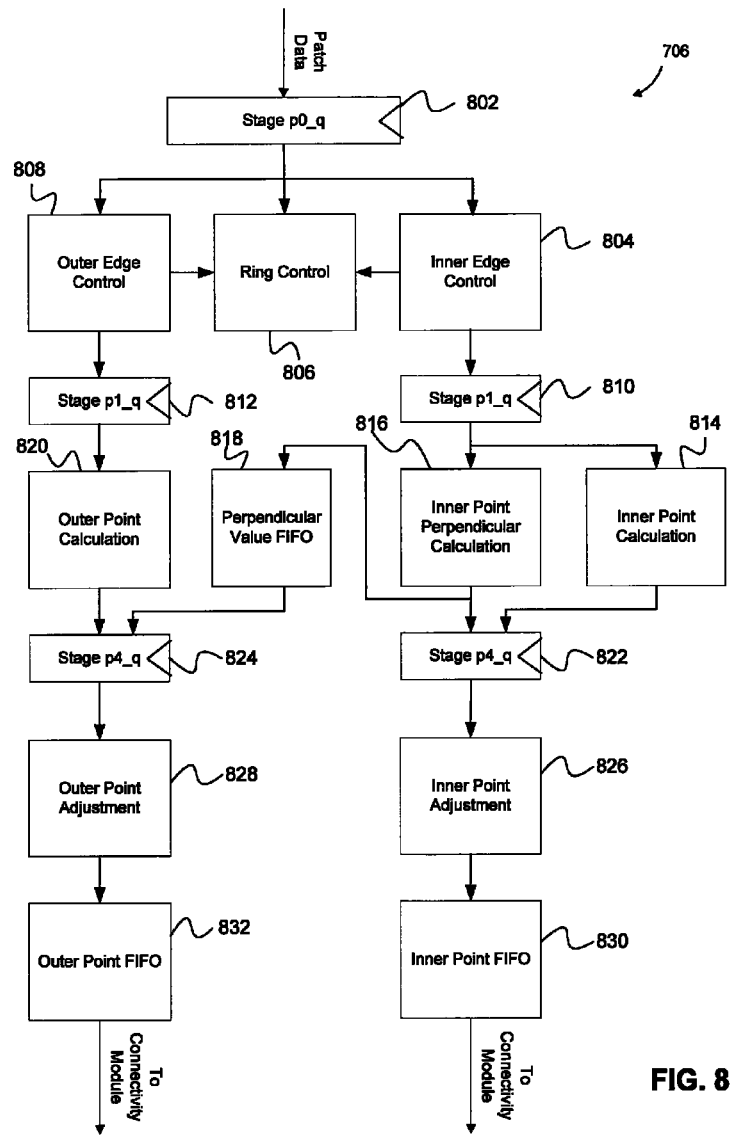
FIG. 8 illustrates an example method for generating tessellation points, implemented by a tessellation module of FIG. 7, in accordance with an embodiment of the present invention.

In an embodiment, tessellation module 706 includes two math unit that process edges of a patch in parallel to generate tessellation points. For example, FIG. 8 illustrates a pipeline of functions implemented by tessellation module 706. The functions illustrated in FIG. 8 are described below with reference to the example patches of FIGS. 9A-9C.

Referring to FIG. 8, tessellation module 706 receives patch data in a stage 802. As mentioned above, tessellation module 706 creates the tessellation points for an outside edge and an inside edge in parallel so that connectivity module 708 can create output primitives in the proper order. In this regard, an outer edge control block 808 identifies an outside edge of the received patch, and an inner edge control block 804 identifies an inside edge of the received patch. For example, the patch in FIG. 9A includes an outside edge 901 and an inside edge 902. Tessellation module 706 starts with the outside left edge 901 and the inside left edge 902 and create points from bottom to top. For example, after staging the data in stages 810 and 812, outer point calculation block 820 calculates tessellation points along outer edge 901; and inner point calculation block 814 calculates tessellation points along inner edge 902. The tessellation points for outer edge 901 are then temporarily staged in 824, and the tessellation points of inner edge 902 are temporarily staged in 822. Outer point adjust block 828 and inner point adjust block 826 adjust for skewing of the tessellation points of outer edge 901 and inner edge 902, respectively. Skewing occurs when points on an inside edge and points on an outside edge are not aligned at the same v coordinate (if the edges are vertical) or the same u coordinate (if the edges are horizontal). The tessellation points are then respectively stored in outer point FIFO 832 and inner point FIFO 830. Connectivity module 708 then retrieves the tessellation points from these FIFOs, as explained in more detail in the next subsection.

After calculating the tessellation points along the two edges on the left side of the patch, tessellation module 706 calculates tessellation points on the two top edges followed by the right side and finally the bottom edges of the ring, as illustrated by a path 904. Once the outer ring is complete, the process repeats for the next inside ring. Ring control block 806 controls the process of transitioning to the next inside ring.

Referring to FIG. 9A, for the next inside ring, edge 902 is the outside edge, and edge 903 is the inside edge. Inner point perpendicular block 816 calculates the perpendicular value, i.e., the value that remains the same across the entire edge. For example, along edge 902, the v value changes, whereas the u value does not change. Thus, along edge 902, the v values are regular values, and the u values are perpendicular values. In contrast, along the top outside edge of the patch in FIG. 9A, the u value changes, whereas the v value does not change. Thus, along the top outside edge, the u values are regular values, and the v values are perpendicular values. Accordingly, along edge 902, for example, inner point calculation block 814 provides v values (from bottom to top) of 0.833, 0.666, 0.5, 0.333 and 0.167, while inner point perpendicular calculation block 816 provides one u value of 0.167 for the entire edge (because the u value along edge 902 remains constant).

During processing of a next ring, regular point values (i.e., values that change along an edge) are recalculated, and not stored. This does not cause any performance issue and decreases hardware area by removing a storage unit. On ther other hand, perpendicular values (i.e., values that remain constant along an edge) are temporarily stored in perpendicular value FIFO 818 from the inner edge and used on the outer edge. During processing of the next inside ring (i.e., when edge 902 is the outside edge), outer point calculation block 820 re-calculates regular point values for the tessellation points along edge 902, and perpendicular point values are retrieved from perpendicular value FIFO 818.

The calculation of all the tessellation points of the patch is complete when all rings within the patch have been processed. This process of point generation forms a snake or serpentine pattern, as illustrated in FIG. 9A, and does not require any point storage because points are created in the order they are connected, as described in more detail below with respect to connectivity module 708. Each piece of point data is indexed as a u,v coordinate used by execution unit 506 to create the new vertex data. Each new primitive created is also tagged with the patch ID.

There are two special cases where the points are generated in a different fashion, which are illustrated in FIGS. 9B and 9C. Both these special cases occur during the last ring of the patch. Referring to FIG. 9B, the first special case occurs when the patch ends as a polygon. This means that the last ring has no inside edges. In this case, tessellation module 706 processes the top and right edges in the outside edge math unit (e.g., functional blocks 808, 812, 820, 824, and 828 of FIG. 8) and processes the left and bottom edges in the inside math unit (e.g., functional blocks 804, 810, 814, 822, and 826 of FIG. 8). This creates a stream of points that then can be connected as a group of triangles in the middle of the patch.

Referring to FIG. 9C, the other special case occurs when a patch ends with a line in the middle. In this case, the points in the middle are processed by the inside edge math unit (e.g., functional blocks 804, 810, 814, 822, and 826 of FIG. 8). It processes the line from left to right and then turns around and regenerates the points from right to left (excluding the rightmost point), as illustrated in FIG. 9C. This is done because there will be triangles above the line and below the line that reuse the same points of the line. In an embodiment, if the line is less than 14 points long, a reuse buffer in connectivity module 708 ensures that the repeated points are only sent to execution unit 506 once.

Both of the special cases described above can also occur with the v dimension being greater than the u dimension. This means that the polygon or line will be vertical instead of horizontal. This causes different edges to be processed in the math units.

D. Connectivity Module 708

Connectivity module 708 receives tessellated point data from tessellation module 706 and creates primitives based on the topology (point, line, or triangle). Connectivity module 708 sends out the vertex data in strip form and sends relative indices for the primitives. Importantly, connectivity module 708 determines which tessellation points of a patch are to be connected in the order in which tessellation module 706 generates the tessellation points, which (as mentioned above) circumvents the need to store the tessellation points in memory as in the DX11 algorithm.

For example, FIG. 13 illustrates an example order in which connectivity module 708 determines the connectivity of the tessellation points for the patch of FIG. 9A. That is, connectivity module 708 processes tessellation points from bottom to top along the two outside edges. Referring to FIG. 13, in an embodiment connectivity module 708 starts from the vertex labeled (0,1) and progresses toward the vertex labeled (0,0). For example, connectivity module 708 may identify vertex (0,1), vertex 1302, and vertex 1304 as being associated with a first primitive (e.g., triangle), labeled with a "1" in FIG. 13. Similarly, connectivity module 708 may next identify vertices 1302, 1304, and 1306 as being associated with a second primitive (e.g., triangle), labeled with a "2" in FIG. 13. In other words, connectivity module 708 determines whether tessellation points are connected into primitives in the same order that tessellation module 706 provides the tessellation points for a patch.

Connectivity module 708 determines the connectivity of the output vertices (i.e., tessellation points) by a set of lookup tables which are accessed based on tessellation factor information. For example, FIG. 11 illustrates a set of 32 lookup tables that connectivity module 708 selects from to determine whether vertices are connected. Referring to FIG. 11, the left-hand column includes the number of the LUT, and the right-hand column includes the LUT.

Unlike connectivity module 708, the DX11 algorithm uses only one 32-entry LUT, which is illustrated in FIG. 11 as the LUT labeled 31. According to the DX11 algorithm, this one LUT is looped through to determine when a triangle can be created. Using only one table, as in DX11, means that it could take up to 32 clocks to create one primitive. This is very inefficient for the hardware because performance requirements are to produce one primitive per clock. In accordance with an embodiment of the present invention, the one LUT is broken into 32 separate tables, as illustrated in FIG. 11. By selecting one of the 32 tables, the selected table can be looped through and a primitive can be created in a single clock cycle.

FIG. 10 illustrates an example method 1000 implemented by connectivity module 708 to determine whether vertices are connected. Referring to FIG. 10, method 1000 begins at a step 1002 in which a lookup table is selected from a plurality of lookup tables. In an embodiment, the lookup table is selected based on a tessellation factor provided by hull shader 204. In particular, the tessellation factor is divided by two, resulting in a number called the "half tess factor," and the half tess factor is used to select the LUT. For example, if the tessellation factor is 10, then the half tess factor would be 5, and the LUT of FIG. 11 labeled 5 (which includes entries {4,2,5,1,6, 3}) would be selected.

Referring again to method 1000 of FIG. 10, in a step 1004 tessellation points are connected into primitives based on the selected lookup table. As mentioned above, FIG. 13 illustrates how vertices may be connected into primitives.

Connectivity module 708 also includes reuse logic that provides tessellation-point data in an efficient manner. Unlike the reuse logic of the tessellation engine, DX11 handles reuse based on an index to the coordinates of the patch (i.e., (u, v) values stored in memory). The index in memory that DX11 uses may be degenerate, meaning that DX11 may send tessellation-point data more than once because the points of a patch are not uniquely indexed in the memory. Specifically, with some values of tessellation factors, DX11's algorithm produces the same patch coordinates (i.e., (u, v) values) for multiple points on an edge. However, DX11 considers these points as unique and sends all of them as output.

In contrast, the tessellation engine of an embodiment of the present invention handles reuse based on the actual coordinates of the patch (i.e., the actual (u, v) values), rather than an index in memory. Using the actual coordinates, as specified by an embodiment of the present invention, helps in cases where degenerate triangles are formed due to DX11's algorithm.

According to an embodiment of the present invention, the tessellation engine sends a first point and determines whether any subsequent points have the same coordinates (i.e., (u, v) value) as the first point. The tessellation engine makes this determination by comparing the coordinate of the first point to coordinates of points in an index buffer (e.g., "Parameter Cache"). In an embodiment, the index buffer stores up to 14 points. If a subsequent point has the same coordinates (i.e., (u, v) value) as the first point, the tessellation engine does not send the subsequent point. This saves shader processing.

For example, FIG. 12 illustrates an example method 1200, implemented by connectivity module 708, for re-using vertices in accordance with an embodiment of the present invention. Method 1200 begins at a step 1202 in which vertices of primitives are indexed according to their respective positions—which are specified by (u,v) values within a patch.

Before sending a vertex for subsequent processing within a graphics pipeline, it is first determined whether the index associated with that vertex is in a buffer, as indicated in step 1204. In an embodiment, the buffer is 14 elements wide. If the index is in the buffer, then as indicated in step 1206 the vertex is not sent for subsequent processing in the graphics pipeline, because the vertex has already be sent to the graphics pipeline.

If, on the other hand, it is determined in step 1204 that the index is not in the buffer, then the vertex is sent for subsequent processing in the graphics pipeline, as indicated in a step 1208. In a step 1210, the index for the vertex is placed in the buffer, and the oldest index is flushed from the buffer in a first-in, first-out fashion.

VI. Example Software Implementations

In addition to hardware implementations of processing units of embodiments of the present invention (e.g., CPU 302 and GPU 310), such processing units may also be embodied in software disposed, for example, in a computer-readable medium configured to store the software (e.g., a computer-readable program code). The program code causes the enablement of embodiments of the present invention, including the following embodiments: (i) the functions of the systems and techniques disclosed herein (such as, the functions illustrated in FIGS. 7, 8, 10, and 12); (ii) the fabrication of the systems and techniques disclosed herein (such as, the fabrication of CPU 302 and/or GPU 310); or (iii) a combination of the functions and fabrication of the systems and techniques disclosed herein.

This can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

VII. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A graphics-processing method implemented in a processing unit, comprising:
    sequentially tessellating a geometric shape to provide a first set of tessellation points from among a plurality of sets of tessellation points for the geometric shape; and
    connecting tessellation points of the first set into one or more primitives in an order in which the tessellation points of the first set is provided, wherein the connecting further comprises:
        selecting a lookup table from a plurality of lookup tables to determine whether tessellation points of the first set of tessellation points are connected; and
        creating a primitive of the one or more primitives in a single clock cycle by looping through the lookup table.

2. The graphics-processing method of claim 1, wherein the sequentially tessellating comprises:
    tessellating an outside edge of the geometric shape to provide a first subset of tessellation points in the first set of tessellation points; and
    tessellating an inside edge of the geometric shape to provide a second subset of tessellation points in the first set of tessellation points.

3. The graphics-processing method of claim 1, wherein the connecting comprises:
    connecting the first set of tessellation points into one or more primitives in an order in which the first set of tessellation points is provided, wherein only the first set of tessellation points from among the plurality of sets of tessellation points is stored in memory.

4. The graphics-processing method of claim 1, further comprising:

indexing respective vertices of the one or more primitives based on a position of each respective vertex within the geometric shape; and determining whether to send a vertex for subsequent processing based on the index of the vertex.

5. The graphics-processing method of claim 1, further comprising:

generating tessellation output based on the one or more primitives;

writing the tessellation output to an on-chip memory when a tessellation factor is below a predetermined threshold; and writing the tessellation output to an off-chip memory when if the tessellation factor is above the predetermined threshold.

6. The method of claim 5, wherein the off-chip memory is quad buffered.

7. The method of claim 1, wherein the selecting the lookup table is based on a tessellation factor.

8. A non-transitory computer readable medium storing instructions for execution by one or more processors to perform operations, comprising:

sequentially tessellating a geometric shape to provide a first set of tessellation points from among a plurality of sets of tessellation points for the geometric shape; and connecting tessellation points of the first set into one or more primitives in an order in which the tessellation points of the first set is provided, wherein the connecting further comprises:

selecting a lookup table from a plurality of lookup tables to determine whether tessellation points of the first set of tessellation points are connected; and creating a primitive of the one or more primitives in a single clock cycle by looping through the lookup table.

9. The non-transitory computer readable medium of claim 8, wherein the sequentially tessellating comprises:

tessellating an outside edge of the geometric shape to provide a first subset of tessellation points in the first set of tessellation points; and tessellating an inside edge of the geometric shape to provide a second subset of tessellation points in the first set of tessellation points.

10. The non-transitory computer readable medium of claim 8, wherein only the first set of tessellation points from among the plurality of sets of tessellation points is stored in memory.

11. The non-transitory computer readable medium of claim 8, further comprising:

indexing respective vertices of the one or more primitives based on a position of each respective vertex within the geometric shape; and determining whether to send a vertex for subsequent processing based on the index of the vertex.

12. The non-transitory computer readable medium of claim 8, further comprising:

generating tessellation output based on the one or more primitives;

writing the tessellation output to an on-chip memory when a tessellation factor is below a predetermined threshold; and writing the tessellation output to an off-chip memory when the tessellation factor is above the predetermined threshold.

13. The non-transitory computer readable medium of claim 8, wherein the selecting the lookup table is based on a tessellation factor.

14. A computing system, comprising:

a system memory; and a processing unit coupled to the system memory;

the processing unit configured to:

sequentially tessellate a geometric shape to provide a first set of tessellation points from among a plurality of sets of tessellation points for the geometric shape; and connect tessellation points of the first set into one or more primitives in an order in which the tessellation points of the first set is provided, the processing unit further configured to:

select a lookup table from a plurality of lookup tables to determine whether tessellation points of the first set of tessellation points are connected; and create a primitive of the one or more primitives in a single clock cycle by looping through the lookup table.

15. The computing system of claim 14, the processing unit further configured to:

tessellate an outside edge of the geometric shape to provide a first subset of tessellation points in the first set of tessellation points; and tessellate an inside edge of the geometric shape to provide a second subset of tessellation points in the first set of tessellation points.

16. The computing system of claim 14, wherein only the first set of tessellation points from among the plurality of sets of tessellation points is stored in the system memory.

17. The computing system of claim 14, the processing unit further configured to:

index respective vertices of the one or more primitives based on a position of each respective vertex within the geometric shape; and determine whether to send a vertex for subsequent processing based on the index of the vertex.

18. The computing system of claim 14, the processing unit further configured to:

generate tessellation output based on the one or more primitives;

write the tessellation output to an on-chip memory when a tessellation factor is below a predetermined threshold; and write the tessellation output to the off-chip memory when the tessellation factor is above the predetermined threshold.

19. The computing system of claim 18, wherein the off-chip memory is quad buffered.

20. The computing system of claim 14, wherein the selection of the lookup table is based on a tessellation factor.

* * * * *

UNITED STATES PATENT AND TRADEMARK OFFICE
CERTIFICATE OF CORRECTION

PATENT NO. : 8,884,957 B2  Page 1 of 1
APPLICATION NO. : 12/708331
DATED : November 11, 2014
INVENTOR(S) : Goel et al.

It is certified that error appears in the above-identified patent and that said Letters Patent is hereby corrected as shown below:

IN THE CLAIMS

Claim 5, column 15, line 14, delete "if".

Signed and Sealed this
Thirtieth Day of June, 2015

Michelle K. Lee
*Director of the United States Patent and Trademark Office*